United States Patent
Larsson et al.

(10) Patent No.: US 8,179,858 B2
(45) Date of Patent: May 15, 2012

(54) METHOD FOR AVOIDING INTERRUPTIONS OF PUSH TO TALK SERVICES

(75) Inventors: Anders Larsson, Manila (PH); Patrik Cerwall, Taby (SE); David Bladsjo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 777 days.

(21) Appl. No.: 11/576,332

(22) PCT Filed: Sep. 30, 2004

(86) PCT No.: PCT/EP2004/052390
§ 371 (c)(1), (2), (4) Date: Jun. 30, 2009

(87) PCT Pub. No.: WO2006/037372
PCT Pub. Date: Apr. 13, 2006

(65) Prior Publication Data
US 2009/0298501 A1 Dec. 3, 2009

(51) Int. Cl.
*H04W 4/00* (2009.01)
*H04W 36/00* (2009.01)

(52) U.S. Cl. .................. 370/331; 455/436
(58) Field of Classification Search ............... None
See application file for complete search history.

(56) References Cited

U.S. PATENT DOCUMENTS

| 5,140,627 A | 8/1992 | Dahlin |
| 7,269,423 B2 | 9/2007 | Lee et al. |
| 7,689,221 B1 * | 3/2010 | Gazzard ............... 455/437 |
| 2004/0259547 A1 * | 12/2004 | Lau et al. ............. 455/436 |
| 2005/0107110 A1 * | 5/2005 | Vasudevan et al. ...... 455/525 |
| 2007/0297364 A1 * | 12/2007 | Fagridas ............... 370/331 |

FOREIGN PATENT DOCUMENTS

| GB | 2 330 484 A | 4/1999 |
| JP | H08-251647 | 9/1996 |
| JP | H09-271056 | 10/1997 |
| JP | H10-004580 | 1/1998 |
| WO | WO 99/65266 A | 12/1999 |

OTHER PUBLICATIONS

Push-to-Talk over Cellular (PoC) User Plane; (E) GPRS/UMTS Specification; PoC Release 2.0. (E) GPRS/UMTS Specification V2.0.4 (Jun. 2004).
TS 05.08 Technical Specification Group GSM/EDGE Radio Access Network subsystem link control (Release 1999).
3GPP TS 23.107 "Technical Specification Group Services and System Aspects; Quality of Service (QoS) concept and architecture" (Release 1999).

* cited by examiner

*Primary Examiner* — John Blanton

(57) ABSTRACT

A method of controlling the cell re-selection of a mobile station (4) between cells (1) of a cellular-based radio access network (6). The method comprises the steps of determining when a cell re-selection for the mobile station (4) is appropriate, determining whether or not the mobile station (4) is involved in a push to talk service comprising a series of talk bursts, and if the mobile station is involved in a push to talk service, delaying the cell re-selection until such time as a period of silence between talk bursts occurs.

7 Claims, 3 Drawing Sheets

METHOD FOR AVOIDING INTERRUPTIONS OF PUSH TO TALK SERVICES

FIELD OF THE INVENTION

The present invention relates to a method and apparatus for avoiding interruptions of so-called push to talk over cellular services. More particularly, the invention relates to avoiding interruptions which arise due to the cell re-selection of mobile stations between radio base stations of the radio access network.

BACKGROUND TO THE INVENTION

Walkie-talkie type services have long proved popular amongst users who wish to communicate brief messages quickly between one another. Conventionally, such services have been provided by two-way portable radios which utilise a dedicated part of the radio spectrum, but which only allow users to communicate with a small group of pre-selected users who utilise similar terminals and who are within range of the relatively short operating range of the radios. More recently, services have been introduced into the United States which piggy-back on the existing cellular telephone infrastructure. However, these services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardising suitable protocols which will allow inter-network operability for Warlike-Talkie services offered over cellular networks. The service established by the various standards is known as Push to talk Over cellular (PoC). PoC proposes that associated speech data will be transported over a packet switched access network. In the case of GSM and UMTS, this will be the general packet radio service (GPRS) access network. In other network architectures, analogous packet switched access networks will be utilised for transporting talk data. Push to Talk services may also be offered over circuit switched access networks, although this is not the preferred option.

As already mentioned above, walkie-talkie type services are ideal for communicating brief messages between two or a relatively small number of users. A talk session is likely to consist of a small number of talk bursts sent in both directions. Given the brief nature of the talk sessions, it is desirable to minimise service interruptions which might arise due to operator network performance issues.

Considering now the provision of GPRS packet switched access in GSM networks, this makes use the GSM cell-based radio access network architecture which is illustrated in FIG. 1. Within each cell 1, a Base Transceiver Station (BTS) 2 provides the interface between a mobile station and the radio access network 3. In order to maintain high quality communication links with mobile stations 4 as mobile stations approach and cross cell boundaries, a cell re-selection mechanism is provided for transferring mobile stations from one BTS to another. Cell re-selection may also occur for other reasons, for example to avoid network congestion. BTSs are grouped into sets, with each set being controlled by a Base Station Controller (BSC) 5. The combination of a BSC and the associated BTSs controlled by that BSC is referred to as a Base Station System (BSS). The radio access network 3 is coupled to a GPRS core network 6 which includes Serving GPRS Support Nodes (SGSNs) 7 and a Gateway SPRS Support Nodes (GGSNs) 8 which facilitate packet switched access to other networks, for example the Internet. As with the cells, the BSCs are arranged in a hierarchical architecture, with groups of BSCs being served by a common SGSN.

GSM specifies extremely sophisticated mechanisms for ensuring that circuit switched voice calls (as opposed to packet switched data sessions) are transferred smoothly during a cell re-selection. Indeed, users are normally unaware that a cell re-selection has occurred. The mechanisms for performing cell re-selection over GPRS sessions are not so sophisticated. As currently specified, cell re-selection of a GPRS session may result in a significant interruption in the transfer of talk bursts associated with a PoC service. This applies in respect of cell re-selections for any of the parties involved in a PoC session, not just the currently talking party. With current implementations of GPRS, cell re-selection is a decision left to the mobile stations, and a cell re-selection (assuming that the old and the new BTS are served by the same BSC) can result in an interruption in the delivery of data of around 2 to 3 seconds. Whilst the most recent GPRS specification sets out an improved, network controlled cell re-selection procedure, the interruption is still on the order of 700 ms. The probability of such a cell re-selection occurring during a PoC session is quite high. In the case of a cell re-selection between BTSs served by different BSCs, the interruption is likely to be even greater, on the order of 4 to 5 seconds, although such cell re-selections will happen only infrequently. In certain rare cases, a BTS cell re-selection will not only result in a change in serving BSC, but will also result in a change in the Serving GPRS Support Node (SGSN) within the GPRS network. This can lead to a service interruption on the order of 10 to 15 seconds.

Such delays are likely to be annoying to users and may have a serious detrimental effect on the perceived quality of the service and therefore on the levels of user satisfaction. While the problem may be mitigated by setting the pre-buffering (downloading before starting playback) in the receiving mobile station long enough to be able to cope with cell re-selections without interruption, this is not desirable as latency is the top-prioritised characteristic for the PoC service, and the longer the pre-buffering, the higher the latency.

SUMMARY OF THE INVENTION

The inventors of the present invention have recognised that, in a typical PoC session, significant periods of silence can be expected to occur between talk bursts. Indeed, periods of silence between switches from one user having control of the floor to another having control are unavoidable. For example, a PoC session may last for a total of forty seconds. Within this forty second session, four talk bursts may be exchanged between users, each talk burst averaging seven seconds in duration. Interleaved between the four talk bursts are three silent periods, each lasting for perhaps four seconds (the time taken to transfer control, plus "thinking" time for the user to whom floor control is handed). These silent periods (extended if necessary) can be advantageously used to perform cell re-selection without resulting in any perceived delay in talk playback to the participating users.

The invention is of course applicable to push to talk services, other than PoC, which utilise cellular networks to transport associated talk data.

It is an object of the present invention to reduce or eliminate delays in talk playback associated with push to talk services utilising cellular telecommunications networks as the traffic transport mechanism.

According to a first aspect of the present invention there is provided a method of controlling the cell re-selection of a mobile station between cells of a cellular-based radio access network, the method comprising the steps of:
  determining when a cell re-selection for the mobile station is appropriate;
  determining whether or not the mobile station is involved in a push to talk service comprising a series of talk bursts; and
  if the mobile station is involved in a push to talk service, delaying the cell re-selection until such time as a period of silence between talk bursts occurs.

The term "push to talk" service is used here to identify services of a walkie-talkie nature. These are services which allow two or more users to be connected together extremely quickly for the exchange of talk bursts. Push to Talk service differ from conventional voice calls in that these services allow only one person to talk at a given time. In order to talk, users must have control of the "floor". Control is typically achieved by one user releasing a talk button to release floor control, and another user pressing a talk button to assume floor control.

Preferably, talk bursts are transported between the mobile stations and the radio access network over a packet switched service. In the case of UMTS and GSM, this service may be the General Packet Radio Service.

Preferably, said step of determining when a cell re-selection for the mobile station is appropriate is carried out within the radio access network. In the case of a GSM/GPRS access network, this is carried out at the serving Base Station Controller. The determination is made based upon measurement received from the mobile station. More preferably, cell re-selection is controlled by the NC2 procedure. The step of delaying the cell re-selection procedure is implemented using the NC2 procedure.

Preferably, said step of determining whether or not the mobile station is involved in a push to talk service comprises inspecting, at the Base Station Controller, the Quality of Service profile for the ongoing packet switched (GPRS) session.

Preferably, the method comprises sending a cell re-selection request to the mobile station from the radio access network following the end of a current talk burst.

In certain embodiments of the invention, the method may comprise overriding said delay to instruct immediate cell re-selection in the event that the radio link quality of the ongoing session falls below an acceptable quality threshold. This threshold may be defined in terms of: carrier to interference ration C/I, Bit Error Rate BER, or cell throughput. In other embodiments, the delay may be overridden if the ongoing talk burst continues beyond some defined timer value. This value may be: predefined based upon expected behaviour, an adaptively calculated valued based on the ongoing speech burst, a value computed on the basis of the previous behaviour of the mobile station, a value computed on previous behaviour of mobile stations handled by the radio access network.

According to a second aspect of the present invention there is provided a method of operating a base station controller of a cellular-based radio access network, the method comprising:
  determining when a cell re-selection for the mobile station is appropriate;
  determining whether or not the mobile station is involved in a push to talk service comprising a series of talk bursts; and
  if the mobile station is involved in a push to talk service, delaying the instructing of a cell re-selection until such time as a period of silence between talk bursts occurs.

According to a third aspect of the present invention there is provided a method of operating a mobile station for use with a cellular-based radio access network, the method comprising:
  determining when a cell re-selection for the mobile station is appropriate;
  determining whether or not the mobile station is involved in a push to talk service comprising a series of talk bursts; and
  if the mobile station is involved in a push to talk service, delaying the instructing of a cell re-selection until such time as a period of silence between talk bursts occurs.

BRIEF DESCRIPTION OF CERTAIN EMBODIMENTS

Push to talk Over Cellular (PoC) is a proposal which is to be implemented on GSM/GPRS networks and which makes use of the IP Multimedia Subsystem (IMS) standardised by the $3^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. A PoC server is located within the IMS or is attached thereto, and implements the functionality for setting up and controlling PoC sessions.

Figure 1:
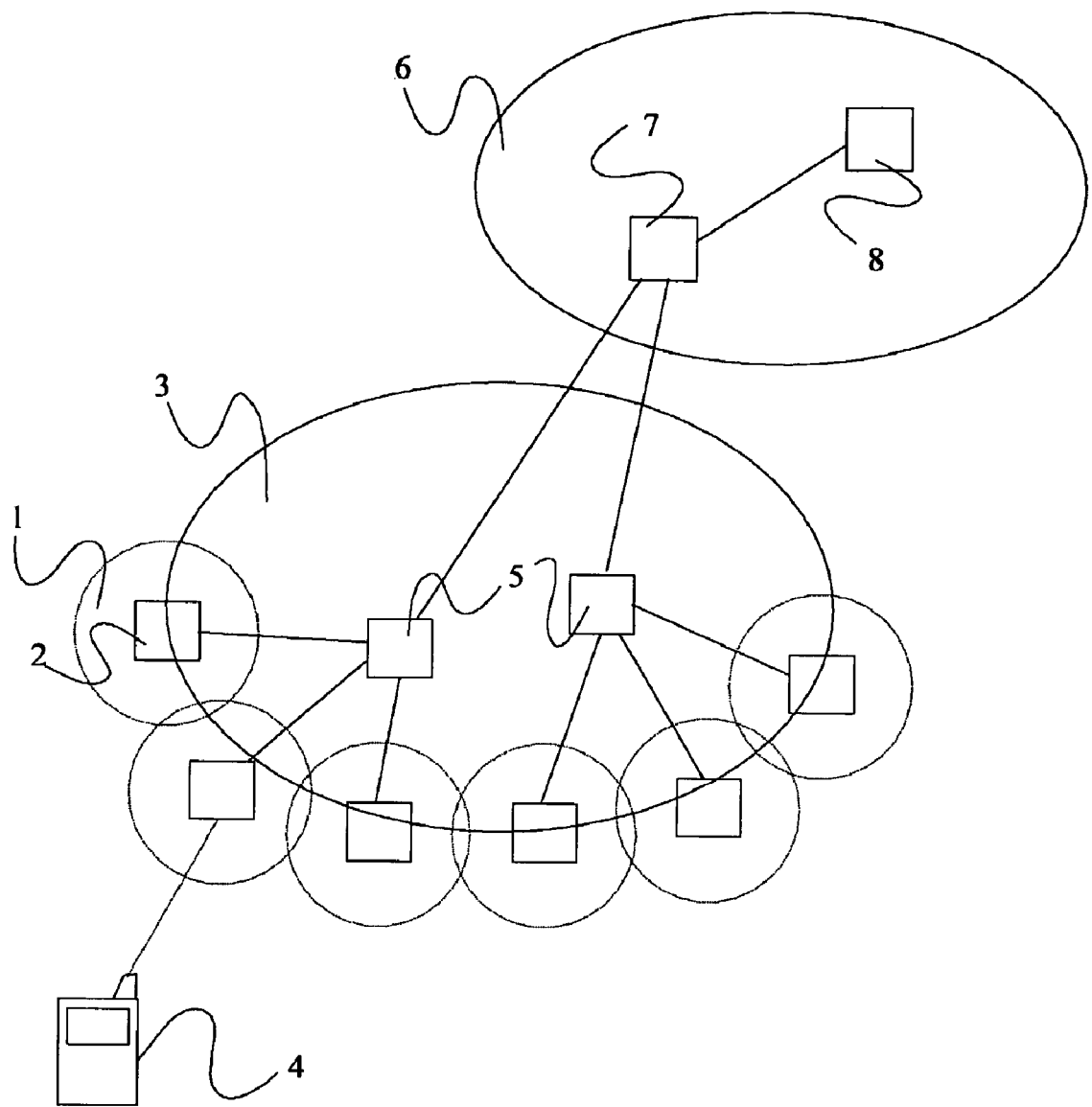
FIG. 1 illustrates schematically a GSM/GPRS network.

With reference to FIG. 1, radio access services are provided to users by way of a cellular architecture. Within each cell, mobile stations communicate over-the-air with a Base Transceiver Station (BTS). Several cells (and associated BTSs) are controlled by a Base Station Controller (BSC). The concept of BTS cell re-selection has been outlined above. In the case of GPRS, the cell re-selection procedures are set out in TS 05.08, "Technical Specification Group GSM/EDGE Radio Access Network subsystem link control (Release 1999). In particular, Chapter 10.1.4 of that TS defines a number of procedures for controlling the cell re-selection behaviour of mobile stations. The currently implemented procedure is "NC0". This leaves cell re-selection decisions to the mobile stations themselves, the decisions being made based upon measurements made by the mobile stations (e.g. signal strength, etc).

An improved cell re-selection control procedure known as "NC2" will be implemented within the Packet Control Unit (PCU) entity at the BSC. NC2 requires that mobile stations periodically send measurement reports to the network identifying the quality of radio links available between the mobile stations and those BTSs with which they are able to communicate (i.e. which are in range). On the basis of these measurements, the serving BSC, which is responsible for a number of BTSs, identifies the BTS to which the mobile station should be attached. In the event that a BTS is identified which is not the BTS with which the mobile station is currently communicating, NC2 requires the BSC to send a cell re-selection command to the mobile station. It will be appreciated that the "new" BTS may be a BTS controlled by that same BSC or by another BSC. In addition, the new BTS may be associated with a different SGSN. When the mobile station receives the relocate command, it selects the cell according to the cell description included in the cell re-selection command. Although NC2 does provide for a mobile station to autonomously re-select a cell, this is only possible following a downlink signal failure or a random access failure.

NC2 requires that a mobile station act immediately upon receipt of a cell re-selection command. In the normal course of events, only a few seconds is likely to elapse between the BSC determining that a cell re-selection is required, and the cell re-selection actually occurring. Whilst NC2 provides adequate mechanisms for ensuring that no data is lost during the cell re-selection, and that the new BTS picks up where the old BTS stopped, it does not completely avoid the introduction of delays in the sending of data from the new BTS. Of course, in the scenario where data is being downloaded to a mobile station, e.g. from a web server, relatively small delays are likely to go unnoticed by users and will certainly not seriously affect the performance level perceived by the users. However, in the case of real time voice data such as is associated with a PoC service, such interruptions are likely to prove extremely annoying to users.

Figure 2:
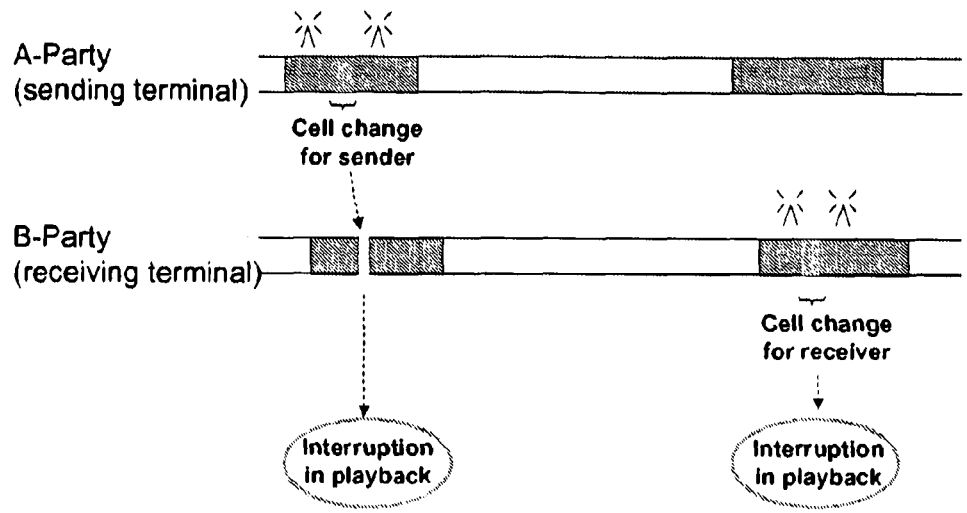
FIG. 2 illustrates the nature of a Push to talk Over Cellular session including speech bursts utilising the current NC0 or NC2 procedure.

FIG. 2 illustrates the nature of a typical PoC session assuming implementation of the NC0 or NC2 (as currently proposed) cell re-selection control procedures. In the illustrated example, a mobile station referred to as the "A-party" transmits two short talk bursts separated by some period of silence. With this talk burst is being sent over the A-Party's radio access network, it is assumed that a cell re-selection occurs for the mobile station of the A-party. The receiving mobile station belonging to the B-party will receive all of the talk burst. However, an interruption is likely to occur in the middle of the playback due to the cell re-selection. Considering now the second short talk burst, it is assumed that a cell re-selection occurs for the mobile station of the B-party during playback of the transmitted speech burst (the B-party's mobile station may be attached to the same radio access network as the A-party's terminal, or to a different access network). Again, whilst all of the transmitted talk burst is played back to the B-party, a short interruption occurs corresponding to the cell re-selection of the B-party's mobile station. As well as being annoying to the receiver, the interruption in the talk burst may seriously affect the intelligibility of the played back speech.

To address this problem, the currently proposed NC2 procedure is modified to allow the introduction of a mechanism which causes cell re-selection to be delayed until a period of silence arises in a PoC service. This firstly requires some means for detecting that a GPRS session for which a cell re-selection is required, is detected as relating to a PoC service. Fortuitously, certain current PCU implementations already make provision for such detection, see 3GPP TS 23.107, "Technical Specification Group Services and System Aspects; Quality of Service (QoS) concept and architecture", (Release 1999). In these implementations, the BSS inspects the QoS profile for the ongoing GPRS session, and if the mobile station uses QoS Streaming with a certain QoS profile, the BSS knows that the ongoing media stream is a PoC type of media flow. A PoC tag is set accordingly.

The NC2 procedure (as currently defined) is modified in order to delay instructing a mobile station to perform a cell re-selection if the PoC tag is set, until such time as any current talk burst, in either the uplink or the downlink direction, has ended. Once a talk burst has ended, the cell re-selection procedure can commence. If this procedure has not completed prior to receipt of a new talk burst from a third party mobile, i.e. in the downlink direction, the talk burst is buffered at the BSC until such time as the cell re-selection has been completed. In the uplink direction, the mobile station will not be able to take control of the floor until the cell re-selection has been completed. Indeed, these are the normal procedures for handling a new talk burst during a cell-reselection procedure.

Figure 3:
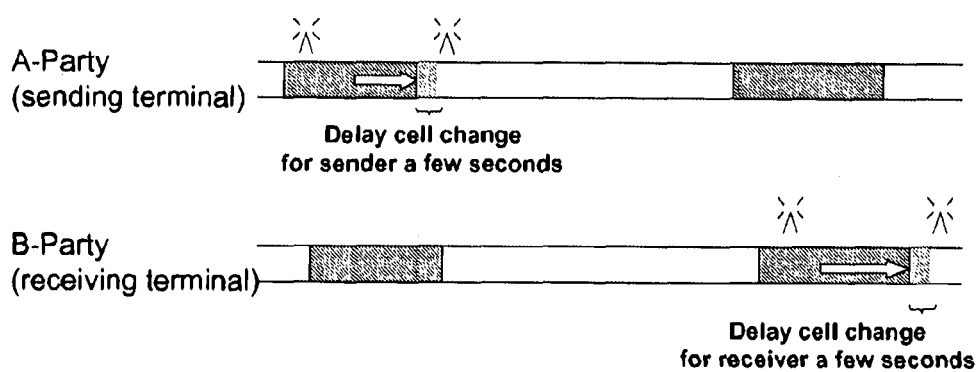
FIG. 3 illustrates the nature of a Push to talk Over Cellular session including speech bursts utilising a modified NC2 procedure.

This is illustrated schematically in FIG. 3 where, again, a cell re-selection of the A-party's mobile station occurs during a first talk burst and a cell re-selection of the B-party's mobile station occurs during a second talk burst. The solution is clearly applicable in both the uplink and downlink directions, and is also applicable to intra-BSC cell reselection, inter-BSC cell reselection, and inter-SGSN cell reselection.

Figure 4:
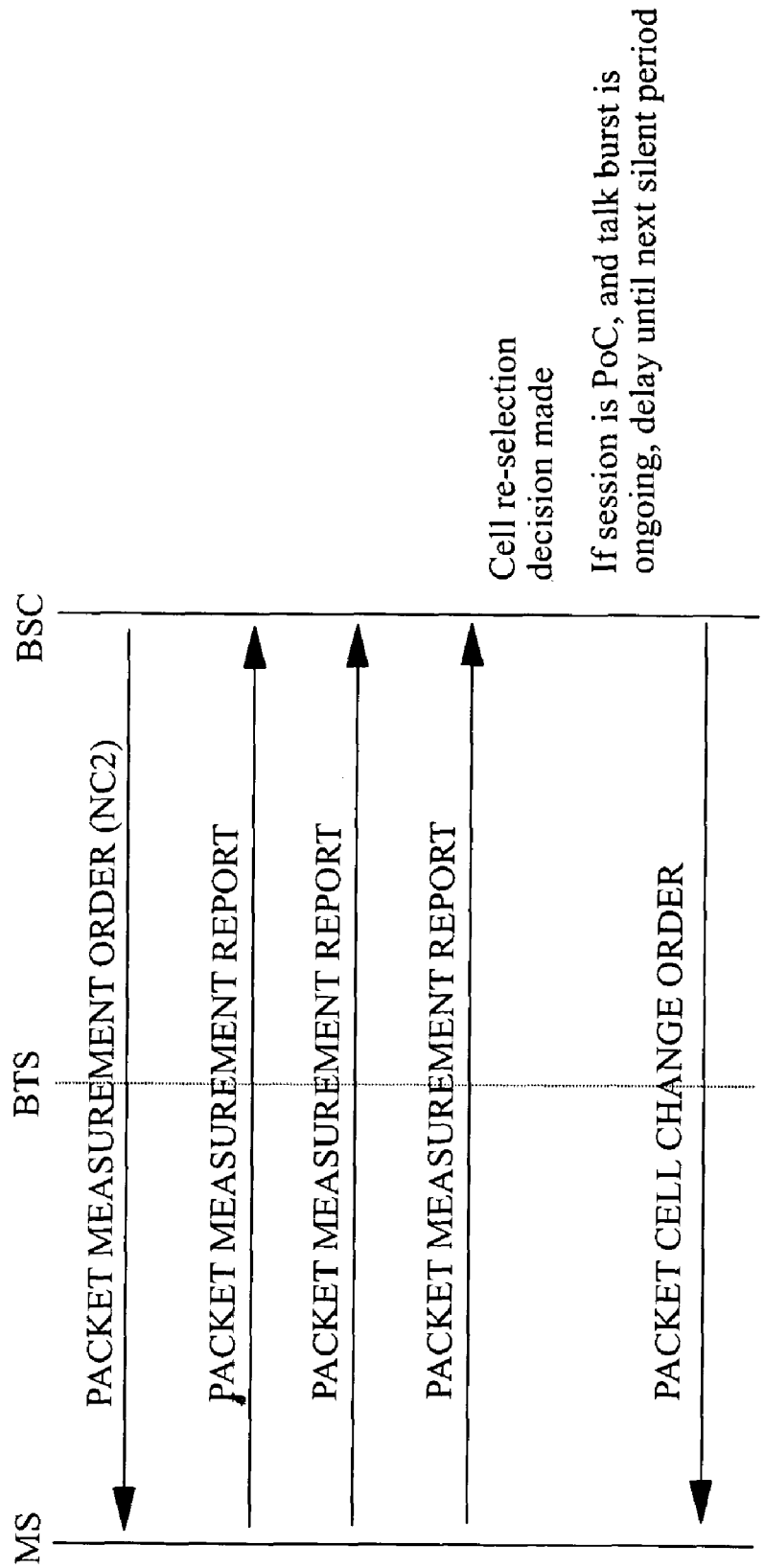
FIG. 4 illustrates signalling in the network of FIG. 1 between a mobile station and the radio access network which is associated with a cell re-selection procedure.

FIG. 4 is a flow diagram illustrating the signalling between the mobile station and the BSC, via the BTS, associated with a cell re-selection procedure.

A key element in implementing the procedure detailed here is the detection of the end of a speech burst associated with a PoC session. One or a combination of criteria can be used for this purpose. These include:

1. An uplink or downlink speech burst is considered ended when the associated (uplink or downlink) Temporary Block Flow (TBF) is released. The TBF is the connection used by the two Radio Resource entities to support the unidirectional transfer of Logical Link Control Protocol Data Units on packet data physical channels. A TBF is temporary and is maintained only for the duration of the data transfer. TBF release happens a configurable time, set by BSS timers, after the last packet is sent or received.

2. A new timer is introduced for this purpose and which is reset after each packet. A speech burst is considered ended if the timer expires before a further packet is received. The same or different timers could be used for the uplink and downlink directions.

3. A downlink speech burst is considered ended immediately when the downlink buffer in the BSS is empty.

4. An uplink speech burst is considered ended when an uplink CV equals 0. (CV is a countdown value sent by the mobile station to the BSS.)

The invention takes advantage of the fact that, in a cellular network architecture, the cells are overlapping. At times of cell re-selection, the radio conditions are still sufficiently good in the "old" cell for transferring data even if cell re-selection is postponed for a few seconds. Since the speech bursts associated with the PoC service are typically quite short, the speech burst will have time to finish before the radio conditions deteriorate significantly. As a result, interruptions may be eliminated altogether. However, in certain situations a talk burst might continue for a relatively long period whilst the mobile station is moving at high speed across a cell boundary. In such a scenario, the service may deteriorate relatively quickly, and it may be necessary to force the cell re-selection to occur even though the talk burst has not yet finished. Different "fallback" decision criteria may be defined to cover this eventuality. These include postponing cell re-selection until:

Either a current speech burst ends or a maximum configurable timer expires.

Either the current speech burst ends or an adaptive time, calculated based upon the ongoing speech burst, expires.

Either the current speech burst ends or an adaptive time, calculated for the particular mobile station, expires.

Either the current speech burst ends or an adaptive time, calculated on the BSS level, expires.

Either the current speech burst ends or radio conditions in the old cell drop below a certain carrier to interference ration (C/I).

Either the speech burst ends or radio conditions in the old cell results in a certain Bit Error Rate.

Either the speech burst ends or throughput in the old cell drops below a certain limit.

Different decision criteria may be applied for different cell reselection types, i.e. for intra-BSC cell reselection, inter-BSC cell reselection, and inter-SGSN cell reselection.

It will be appreciated by the person of skill in the art that various modifications to the above embodiments may be made without departing from the scope of the present invention. For example, it is possible to signal the cell re-selection immediately to the mobile station, and then implement the delay at the mobile station. The mobile station would know if it is involved in a PoC session. However, this solution may have disadvantages as it would create type approval issues for the mobile station, within the current 3GPP specifications. Of course the 3GPP standard could be changed to allow such behaviour, but currently the lower-layers are very separate from the application layers. A further disadvantage with a mobile station based solution would be that it would only work for those particular mobile stations that choose to implement the solution, while a network based solution would work for all NC2 capable mobile stations.

The invention claimed is:

1. A method of controlling cell re-selection of a mobile station between cells of a cellular-based radio access network, the method comprising the steps of:
   determining, within the radio access network, when cell re-selection for the mobile station is appropriate;
   determining whether the mobile station is involved in a packet-switched push-to-talk service comprising a series of talk bursts, by inspecting, at a Base Station Controller, a Quality of Service profile for the ongoing packet-switched session;
   when the mobile station is involved in the push-to-talk service, delaying cell re-selection until such time as a period of silence between talk bursts occurs, or the ongoing talk burst reaches a defined timer value; and
   instructing immediate cell re-selection in the event that the ongoing talk burst continues beyond the defined timer value;
   wherein the timer value is defined based upon one of:
      expected behavior of the mobile station;
      an adaptively calculated value based on the ongoing talk burst;
      a value computed on the basis of previous behavior of the mobile station; and
      a value computed on previous behavior of other mobile stations handled by the radio access network.

2. The method according to claim 1, wherein the packet-switched service is the General Packet Radio Service (GPRS).

3. The method according to claim 1, wherein the radio access network is a GSM/GPRS network, and said step of determining when cell re-selection for the mobile station is appropriate is carried out at a serving Base Station Controller based upon measurements received from the mobile station.

4. The method according to claim 3, wherein cell re-selection is controlled by a Network Control 2 (NC2) procedure, and the step of delaying cell re-selection is implemented using the NC2 procedure.

5. The method according to claim 1, further comprising sending a cell re-selection request to the mobile station from the radio access network following the end of a current talk burst.

6. The method according to claim 1, further comprising overriding the delaying step in the event that a radio link quality falls below an acceptable quality threshold.

7. The method according to claim 6, wherein said threshold is defined in terms of one of carrier-to-interference ratio (C/I), Bit Error Rate (BER), and cell throughput.

* * * * *

UNITED STATES PATENT AND TRADEMARK OFFICE
CERTIFICATE OF CORRECTION

| | | |
|---|---|---|
| PATENT NO. | : 8,179,858 B2 | Page 1 of 1 |
| APPLICATION NO. | : 11/576332 | |
| DATED | : May 15, 2012 | |
| INVENTOR(S) | : Larsson et al. | |

It is certified that error appears in the above-identified patent and that said Letters Patent is hereby corrected as shown below:

In Column 1, Line 32, delete "Warlike-Talkie" and insert -- Walkie-Talkie --, therefor.

In Column 1, Line 66, delete "SPRS" and insert -- GPRS --, therefor.

In Column 3, Line 47, delete "ration" and insert -- ratio --, therefor.

In Column 4, Line 27, delete "BRIEF" and insert -- DETAILED --, therefor.

In Column 7, Line 5, delete "ration" and insert -- ratio --, therefor.

Signed and Sealed this
Twenty-third Day of October, 2012

David J. Kappos
*Director of the United States Patent and Trademark Office*